W. RUFF.
WORK HOLDER FOR MACHINE TOOLS.
APPLICATION FILED DEC. 18, 1918.
1,357,518.
Patented Nov. 2, 1920.
2 SHEETS—SHEET 2.
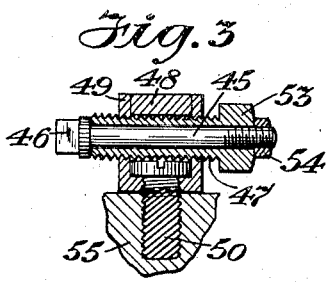
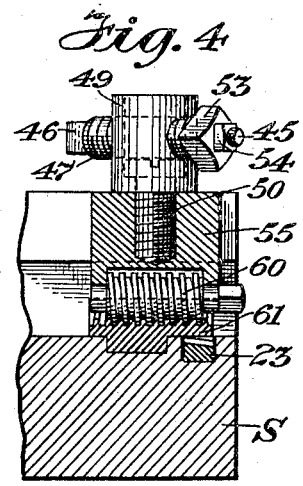
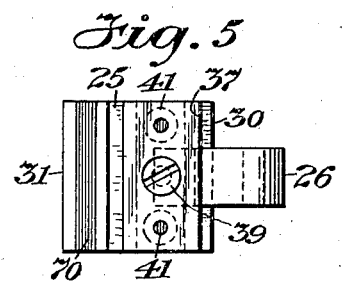
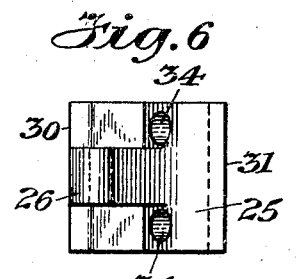
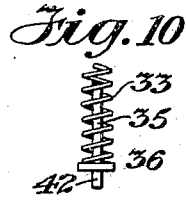
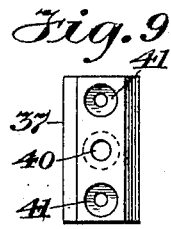
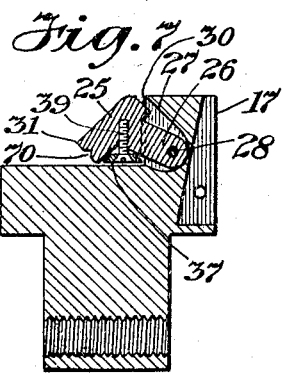
INVENTOR
William Ruff
BY
John O. Seifert
HIS ATTORNEY

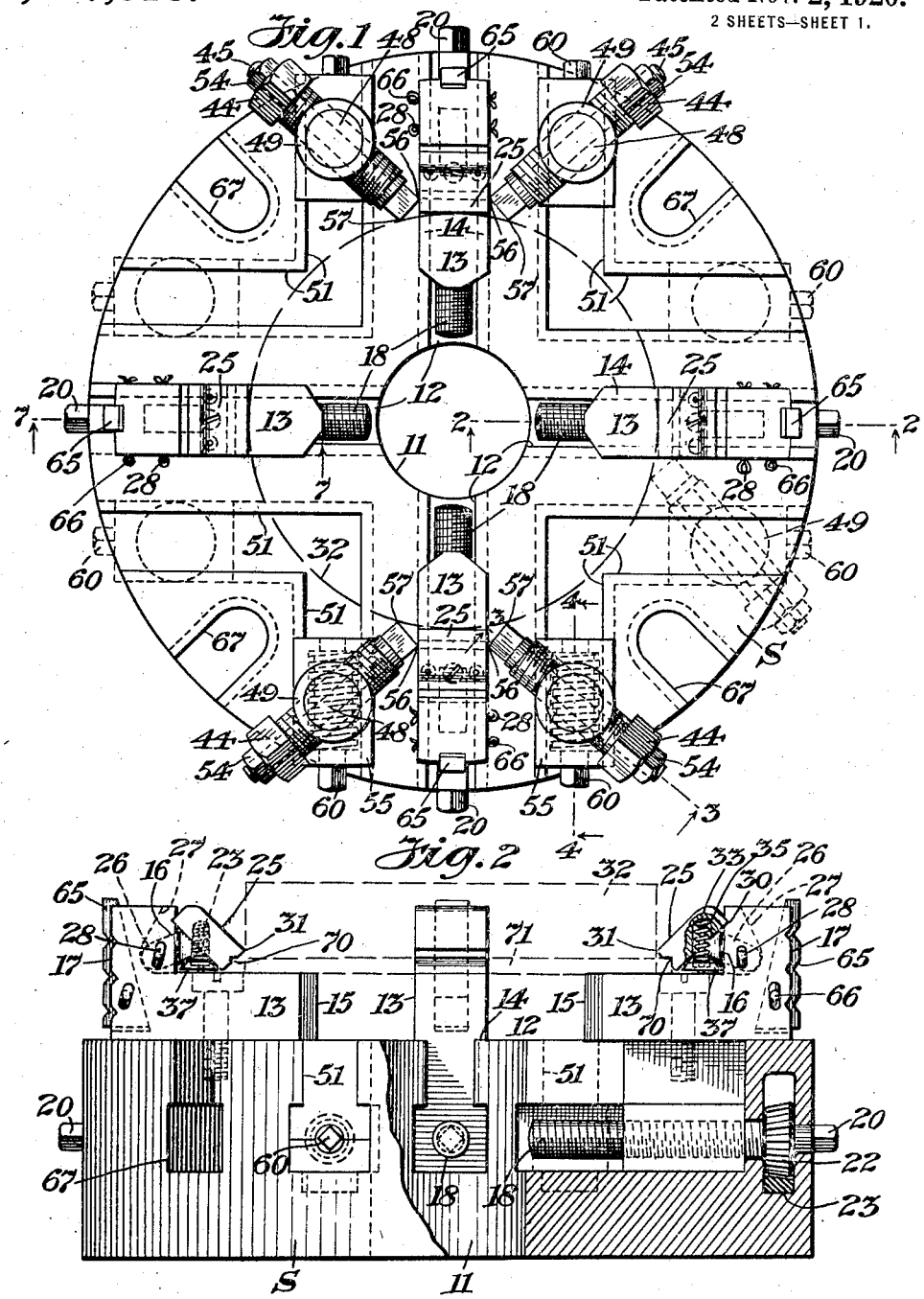

UNITED STATES PATENT OFFICE.

WILLIAM RUFF, OF NEW YORK, N. Y.

WORK-HOLDER FOR MACHINE-TOOLS.

1,357,518.     Specification of Letters Patent.     Patented Nov. 2, 1920.

Application filed December 18, 1918. Serial No. 267,294.

*To all whom it may concern:*

Be it known that I, WILLIAM RUFF, a citizen of the United States, and a resident of the borough of Manhattan, in the city, county, and State of New York, have invented new and useful Improvements in Work-Holders for Machine-Tools, of which the following is a specification.

This invention relates to work holders for machine tools to be used in connection with work carrying chucks, and which is also adapted for use with planers, shapers and the like to secure the work to the table of such machine tools, or to secure the work to the face plate of a lathe, drill press and the like, and it is the object of the invention to provide an improved work holder of this character to not only firmly clamp the work by the holder but to also draw the work firmly to the base of the work support, and to provide a work holder which is not only simple and cheap in construction but highly efficient in operation.

It is a further object of the invention to provide an improved clamping member for work holders of machine tools, comprising a jaw adapted to be adjustably carried by the work support, and a work clamping dog carried by the jaw so constructed, arranged and mounted upon the jaw whereby the work clamping force applied to the dog by the jaw is out of line with the work gripping portion of the dog to not only force the dog firmly to work clamping position but to also firmly draw the work to the work support.

It is another object of the invention to provide means to lock the dogs in work clamping position, and which means are also arranged to engage the work and further facilitate the holding of the work against rotative movement.

In the drawings accompanying and forming a part of this specification, Figure 1 is a plan view of a chuck with my improved work clamping means applied thereto, only so much of the work clamping means being shown as is essential to an understanding of the invention.

Fig. 2 is an elevational view with a portion of the clamping means removed, and shown partly in section, the section being taken substantially on the line 2—2 of Fig. 1 looking in the direction of the arrows.

Fig. 3 is a sectional detail view of the means to lock the work clamping dog in work clamping position, and is taken substantially on the line 3—3 of Fig. 1 looking in the direction of the arrows.

Fig. 4 is a sectional view of a portion of the chuck taken substantially on the line 4—4 of Fig. 1 looking in the direction of the arrows to show the manner of adjustably mounting the locking means for the work clamping dogs.

Fig. 5 is an enlarged view of the work clamping dog looking at the bottom.

Fig. 6 is an elevational view of the work clamping dog with portions removed looking at the bottom from the right of Fig. 5.

Fig. 7 is a sectional view of a work clamping dog carrying jaw and the dog, said section being taken substantially on the line 7—7 of Fig. 1 looking in the direction of the arrows.

Fig. 8 is a sectional end view and Fig. 9 a plan view of the plate used in connection with the clamping dog; and Fig. 10 is an elevational view of the stud and spring used in connection with the work clamping dog to normally urge the dog in a direction away from the work support.

Similar characters of reference designate like parts throughout the different views of the drawings.

An embodiment of my invention is shown in the drawings in connection with a chuck or face plate of a lathe, drill press or the like by which the work is to be supported, (designated in a general way by S), comprising a head or block, which may be built up of a pair of releasably connected axial sections, having a central opening 11 from which radiate slots 12 substantially at right angles to each other and cut through the face of the block. The cross sectional shape of said slots is substantially as shown in Fig. 2 with the lower portion of greater cross sectional area than the upper portion cutting through the face of the plate. Jaws 13, shown as four in number, are slidably mounted in said recesses 12, the portions of said jaws above the block being of such width so that a portion thereof will rest upon the face of the block as clearly shown at 14 in Figs. 1 and 2. These jaws are of suitable shape and are shown provided with a series of vertical faces 15, 16 and 17, and are adapted to have radial adjustment by lead screws 18 engaging in a complementary threaded opening in the portions of the jaws engaging in the recesses 12, and having a part 20 projecting from the lateral portion of the block arranged for the application of a wrench to rotate the same. To simultaneously adjust the four jaws toward or outward from the center of the block each of the lead screws 18 is provided with a pinion 22 to mesh with an annular toothed member or gear 23 movably mounted in an annular recess, and it will be obvious that as one of the lead screws is rotated by a wrench applied to the projecting portion 20 of a screw all of the lead screws will be rotated through the annular gear 23.

As stated it is an object of the invention to provide means to not only firmly clamp the work but to also draw the work in a longitudinal direction to firmly clamp the work to the work support. For this purpose there are provided work clamping dogs adapted to be carried by the jaws to project from one of the vertical faces 15, 16 or 17, and shown as projecting from the face 16. These dogs comprise blocks 25 substantially of angular shape having an arm 26 projecting laterally from the block and adapted to engage in a recess 27 in the jaws, said arm being pivotally supported therein by a pin 28, preferably a cotter pin, passing through openings in said arm and the block and which openings are of greater diameter than the pin to permit the dog to have slight vertical movement as well as rotative movement. The dog is so arranged that the work gripping force applied thereto by the jaws is out of line with the work contacting or gripping portion of the dog. For this purpose the jaws have a substantially V-shaped notch at opposite sides of the arm engaging recess 27 for the engagement of a corner of the block, as shown at 30. The corner of the dog block 31 diagonally opposite to the corner engaging the jaw constitutes the work contacting or gripping portion of the dog to grip the work as shown in Figs. 1 and 2, the work being indicated by the dash lines 32. It will be obvious that as the dog carrying jaws are moved inward toward the work 32 the force of the jaw will be applied to the dog at 30 thus not only moving the dog toward the work but also forcing the work in a direction toward the work support. To permit of this vertical movement of the dogs the dogs are normally urged yieldingly in an upward direction by coiled springs 33 seated in recesses 34 in the block at opposite sides of the arm 26 (Fig. 6), said springs being coiled about studs 35 and confined between the bottom of the recesses and shoulders 36 on said studs and retained therein by a plate 37 (Figs. 8 and 9) secured to the dog at the juncture of the block 25 and arm 26 by a screw 39 passing through and countersunk in an opening 44 centrally in the block. This plate has countersunk openings 41 at opposite sides of the screw opening for the engagement of the stud shoulder 36 and for the passage of a portion 42 of the stud beyond the shoulder 36, which projecting portion 42 of the stud is adapted to engage the face of the work holder or the work supporting face of the dog as shown, with the result that the springs 33 normally urge the dog upward clear of the work holder. As the dog carrying jaw is moved inward the portion 31 of the dog engages the work and as the jaw is continued to be moved in due to the connection 30 of the dog and jaw the force applied to the dog will be out of line with the work gripping portion of the dog rocking the dog and moving it downward toward the work support against the action of the springs 33 and with the dog moving the work toward the work support, thus not only firmly clamping the work between opposite dogs but also firmly holding the work against the work support and preventing chattering of the work as the same is operated upon by the tool.

To lock the dogs 25 in work clamping position there are provided adjustable dogs indicated in a general way at 44 in Figs. 1 and 4. These dogs comprise a bolt 45 (Fig. 3) having a squared head 46 and passing through a sleeve 47 threaded into a block 48 and a tubular member 49 adjustably secured by a screw 50 to a block 55 slidably mounted in recesses 51 in the block S extending parallel with, and substantially of the same shape as, the recesses 12 for the dogs 13. To adjust the sleeve 47 it has a squared head 53 for the application of a wrench, and to secure the bolt 45 in the sleeve a nut 54 is applied to the threaded end of the bolt projecting from the sleeve. By the provision of the squared end 46 of the block it may be so adjusted that one side of the head will engage the dog 25, as shown at 56, (Fig. 1), as the sleeve is screwed into the block 48 and member 49, thereby locking the dog in work clamping position, while the edge of the squared end of the bolt opposite to the portion engaging with the dog 25 is adapted to engage with the work 32, as shown at 57, (Fig. 1,) and hold the work against rotative movement and thereby permitting a heavier cut by the cutting tool. There are two of the locking dogs provided for each of the work clamping dogs 25 one at opposite sides of the work clamping dog carrying jaws 13.

To adjust the locking dogs the portion of the blocks 55 within the slots 51 is formed in the nature of a one-half nut for the engagement of the lead screw 60, or the said portion of the block may have a recessed portion with a part engaging shoulders at opposite ends of the screw, and a part 61 in the form of a one-half nut is mounted in the bottom of the slots 51 against movement. The lead screws are arranged for the application of a wrench for rotating the same. As the lead screws are rotated they will travel inward or outward according to the direction of rotation thereof, while the nut portion 61 will remain in fixed position and the block 55 with the dog carrier and dog will be moved inward or outward in accordance with the direction of rotation of the lead screw. These dogs are also adapted to be adjusted to perform the function of clamping the work only by adjusting the dog carrying members 48, 49 with the screws 50.

The work clamping dogs 25 may also be carried in the faces 15 and 17 of the jaws. In the present instance the face 17 of such jaws are shown provided with a work clamping dog 65 mounted therein by a cotter pin 66 passing through openings in the dog and jaw to permit of the dog having vertical movement relative to the jaw, the recess in the jaw and the dog being so constructed and arranged to permit of such movement.

The block or plate S may also be provided with radial slots 67 located between the slots 51, and which slots may be of a shape similar to the slots 12 and 51 for engagement of either of the work clamping dog carrying jaws 13 or the blocks 55.

It is essential that the work clamping portion 31 of the dogs 25, especially when clamping a circular piece of work, be in the same circular plane, and to permit of the accurate grinding of such work contacting portions 31 of the dogs there is provided a notch or recess 70 substantially of V-shape in the wall of the dog blocks 25 below the contacting point 31 in which a flat piece of stock 71 is adapted to engage when the dogs are moved by the jaws to work clamping position or to clamp such stock. By this arrangement the work contacting portion 31 of the dogs will extend above the piece of stock 71 in position for the engaging of a grinding tool to accurately grind such contacting points of the respective dogs.

Having thus described my invention, I claim:

1. In work holders for machine tools, the combination of a support for the work; jaws adjustably carried by the support; work clamping dogs carried by the jaws and arranged with the work engaging portion of the dogs out of line with the work clamping force applied thereto and operative to force the work toward the support; and means to lock the dogs in work clamping position.

2. In work holders for machine tools, the combination of a support for the work; jaws adjustably carried by the support; work clamping dogs carried by the jaws arranged to force the work against the support as the dogs are moved to work clamping position by the jaws; and means to lock the dogs in work clamping position and operate to hold the work against rotative movement.

3. In a work clamp for machine tools, a jaw adapted to be adjustably supported and a work clamping dog comprising an angular block portion with a laterally projecting arm to engage a recess in the jaw, a pin to pass through openings in said arm and the jaw to support the dog to have rotative and lateral movement, and said angular portion being arranged relative to the supporting arm whereby one corner of the block will engage a notch in the dog to constitute the force applying portion of the dog, and the corner of the block diagonally opposite to said jaw engaging corner constituting the work gripping portion of the dog.

4. In a work clamp for machine tools, a jaw adapted to be adjustably supported; and a work clamping dog comprising an angular block portion with a laterally projecting arm to engage a recess in the jaw, a pin to pass through openings in said arm and jaw to support the dog from the jaw to have rotative movement and movement in a vertical direction, and said angular portion being arranged relative to the supporting arm whereby one corner of the block will engage a notch in the dog to constitute the force applying portion of the dog, and the corner of the block diagonally opposite to said jaw engaging corner constituting the work gripping portion of the dog, a pair of recesses in the block, springs in said recesses, a plate extending transversely of the dog having countersunk recesses in line with the recesses in the dog, and shouldered studs engaging in the dog and plate recesses with a portion of the studs projecting through the plate to engage the work support for the purpose specified.

5. In a work clamp for machine tools, a work support; a jaw adjustably carried by the support; a dog; means to support the dog from the jaw to have movement in a vertical direction; means to normally yieldingly urge the dog upward; said dog and jaw being arranged whereby the work clamping force of the jaw applied to the dog is out of line with the work gripping portion of the dog toward the work and in a direction longitudinally of and toward the work support against the action of the yielding means; and adjustable means carried by the work support to lock the dogs in work clamping position.

6. In a work clamp for machine tools, a work support; a jaw adjustably carried by the support; a dog; means to support the dog by the jaw to have movement in a vertical direction; means to normally yieldingly urge the dog upward; said dog and jaw being arranged whereby the work clamping force applied to the dog by the jaw is out of line with the work gripping portion of the dog toward the work and in a direction longitudinally of and toward the work support against the action of the yielding means; and dogs adjustably carried by the work support arranged to have a part engage opposite sides of the work clamping dog to lock said dogs in work clamping position, and a part to engage the work to hold the same against rotative movement.

WILLIAM RUFF.